United States Patent
Zvak

(10) Patent No.: US 10,228,080 B2
(45) Date of Patent: Mar. 12, 2019

(54) BRACKET FOR MOUNTING A PIPE AWAY FROM A VERTICAL WALL

(71) Applicant: Radim Zvak, Addison, IL (US)

(72) Inventor: Radim Zvak, Addison, IL (US)

(*) Notice: Subject to any disclaimer, the term of this patent is extended or adjusted under 35 U.S.C. 154(b) by 90 days.

(21) Appl. No.: 15/161,171

(22) Filed: May 20, 2016

(65) Prior Publication Data

US 2016/0341339 A1 Nov. 24, 2016

Related U.S. Application Data

(63) Continuation-in-part of application No. 13/967,330, filed on Aug. 14, 2013, now abandoned, which is a continuation-in-part of application No. 13/180,747, filed on Jul. 12, 2011, now abandoned.

(51) Int. Cl.
*F16L 3/02* (2006.01)
*F16L 3/10* (2006.01)
*F16L 3/123* (2006.01)

(52) U.S. Cl.
CPC ............. *F16L 3/1066* (2013.01); *F16L 3/02* (2013.01); *F16L 3/123* (2013.01)

(58) Field of Classification Search
CPC ............ F16L 3/1066; F16L 3/02; F16L 3/123
See application file for complete search history.

(56) References Cited

U.S. PATENT DOCUMENTS

| | | | | |
|---|---|---|---|---|
| 810,004 A | * | 1/1906 | Tabler | F16L 3/13 114/364 |
| 827,627 A | * | 7/1906 | Graham | A47H 1/13 248/254 |
| 886,241 A | * | 4/1908 | Norton | F16G 11/10 24/130 |
| 969,051 A | * | 8/1910 | Garraway et al. | A47H 1/13 248/254 |
| 2,835,464 A | * | 5/1958 | Kolodin | F16L 3/14 248/59 |
| 3,163,392 A | * | 12/1964 | Husted | A47F 5/0823 211/96 |
| D279,450 S | * | 7/1985 | Chap | D6/325 |
| D316,031 S | * | 4/1991 | Goodman | D8/363 |
| 5,582,303 A | * | 12/1996 | Sloan | A47G 25/0692 211/105.1 |
| 5,848,770 A | * | 12/1998 | Oliver | E21F 17/02 248/58 |

(Continued)

*Primary Examiner* — Anita M King
(74) *Attorney, Agent, or Firm* — Chicago IP Law; Steven M. Evans

(57) ABSTRACT

Bracket for mounting a pipe away from a vertical wall having a linear support to be secured to a vertical wall and a pipe receptacle for receiving and supporting the pipe. The pipe receptacle includes a segment of a circle configuration, and an extension is connected between the linear support and the pipe receptacle, wherein the extension extends upward, non-horizontally, non-vertically, and away from the pipe receptacle toward the linear support so as to position a pipe within the pipe receptacle a distance away from the linear support. A brace is connected between the linear support and a lower portion of the pipe receptacle to provide additional support to position the pipe receptacle a distance away from a wall to which the linear support is to be secured.

11 Claims, 18 Drawing Sheets

(56) References Cited

U.S. PATENT DOCUMENTS

| | | | | |
|---|---|---|---|---|
| 5,957,416 | A * | 9/1999 | Sellati | H02G 3/26 248/58 |
| D429,999 | S * | 8/2000 | Swolsky | D8/372 |
| 7,252,274 | B1 * | 8/2007 | Brannen | A47J 45/02 248/301 |
| 7,578,486 | B1 * | 8/2009 | Taylor | A01G 9/128 248/316.7 |
| 7,789,359 | B2 * | 9/2010 | Chopp, Jr. | H02G 3/263 182/129 |
| 9,345,343 | B2 * | 5/2016 | Sobb | A47F 5/0823 |
| 2011/0036963 | A1 * | 2/2011 | Castellanos | A47B 96/06 248/534 |
| 2013/0015301 | A1 * | 1/2013 | Zvak | F16L 3/123 248/74.1 |
| 2014/0103170 | A1 * | 4/2014 | Zvak | F16L 3/123 248/74.1 |
| 2014/0231606 | A1 * | 8/2014 | Sobb | A47F 5/0823 248/224.8 |

* cited by examiner

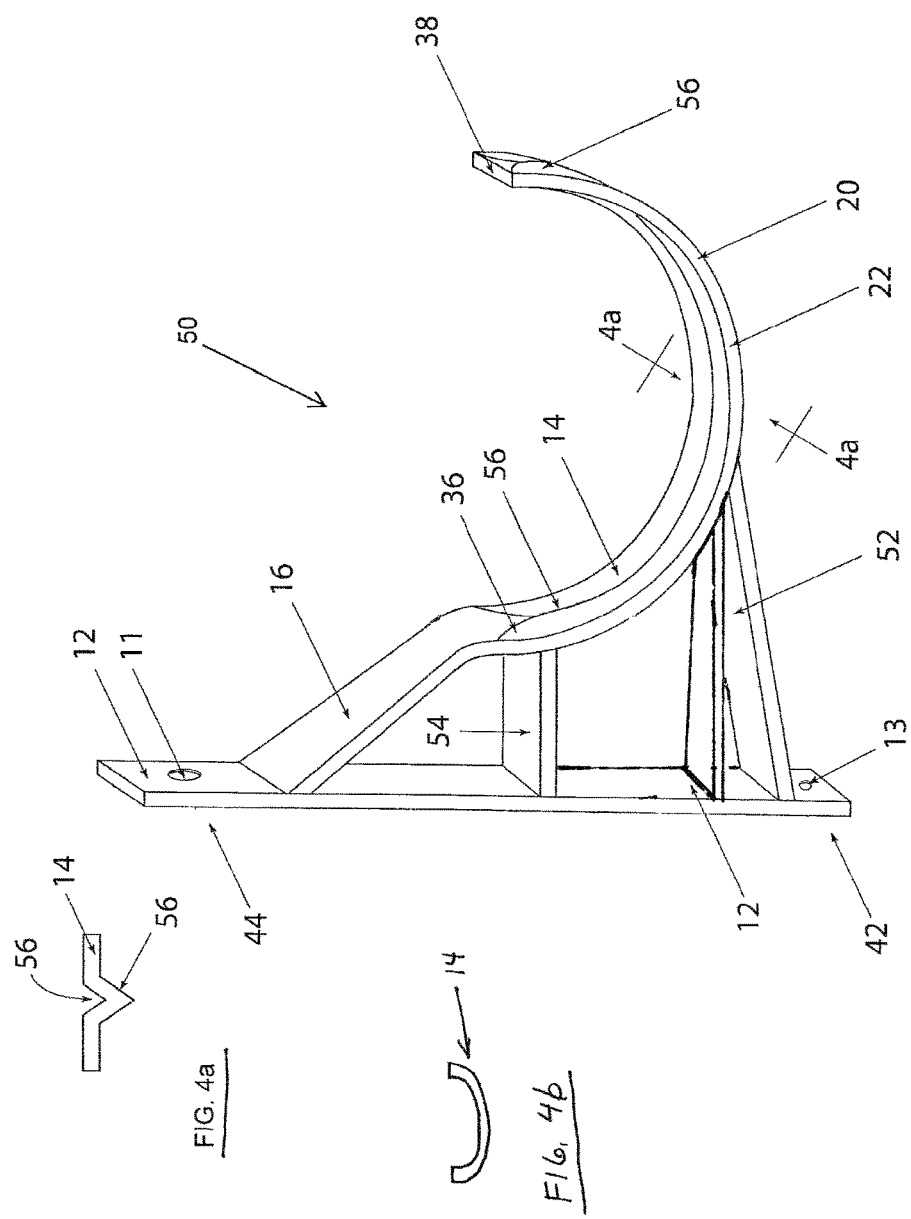

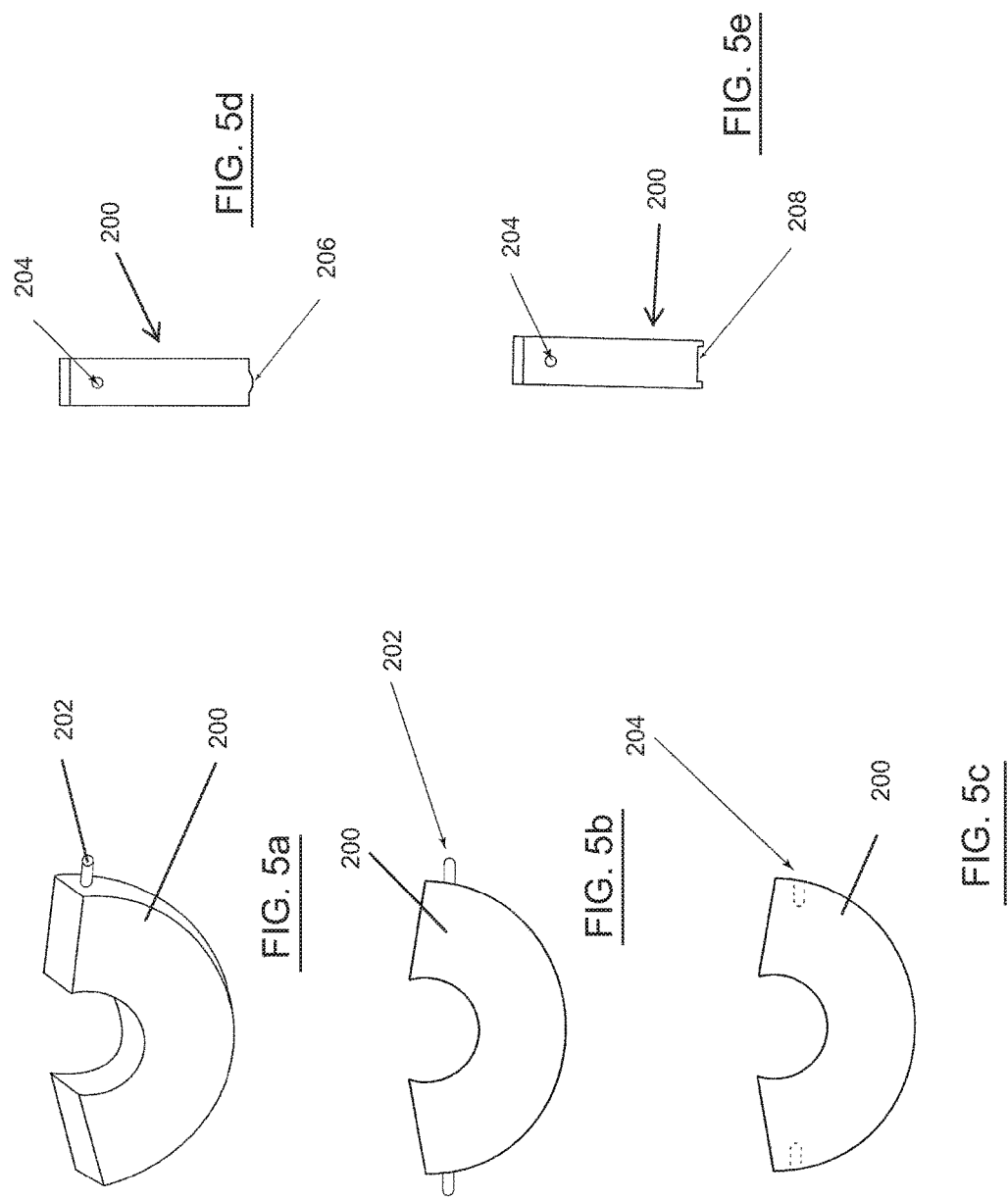

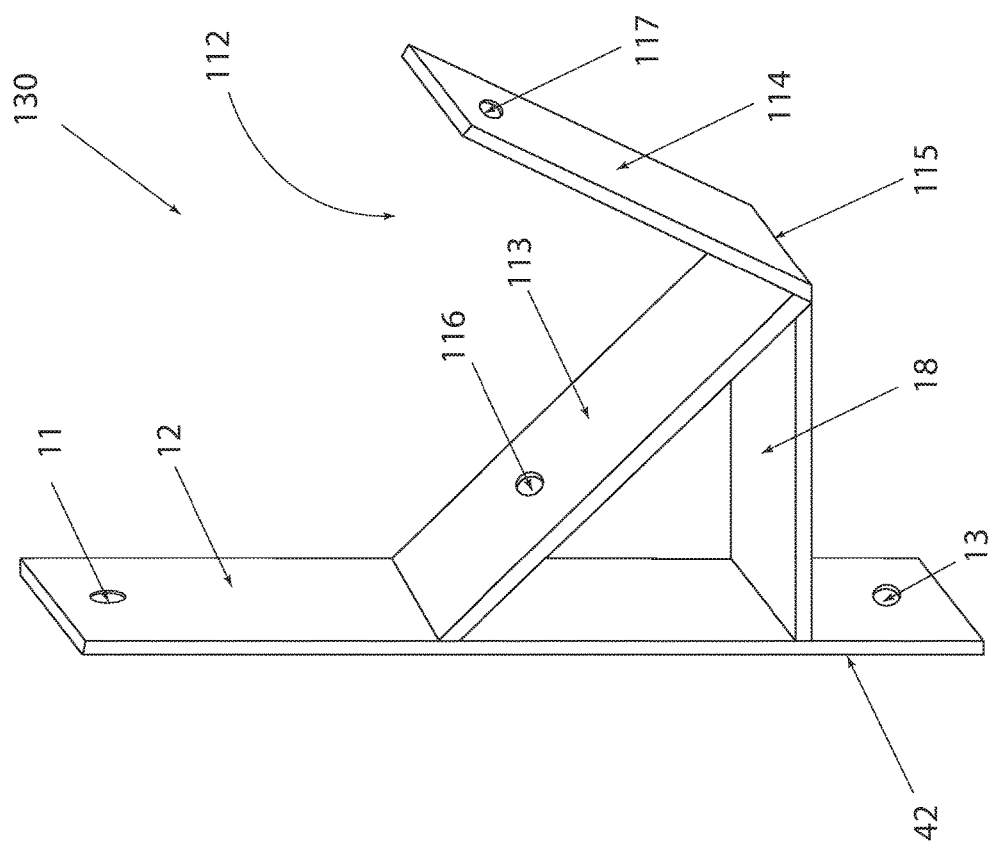

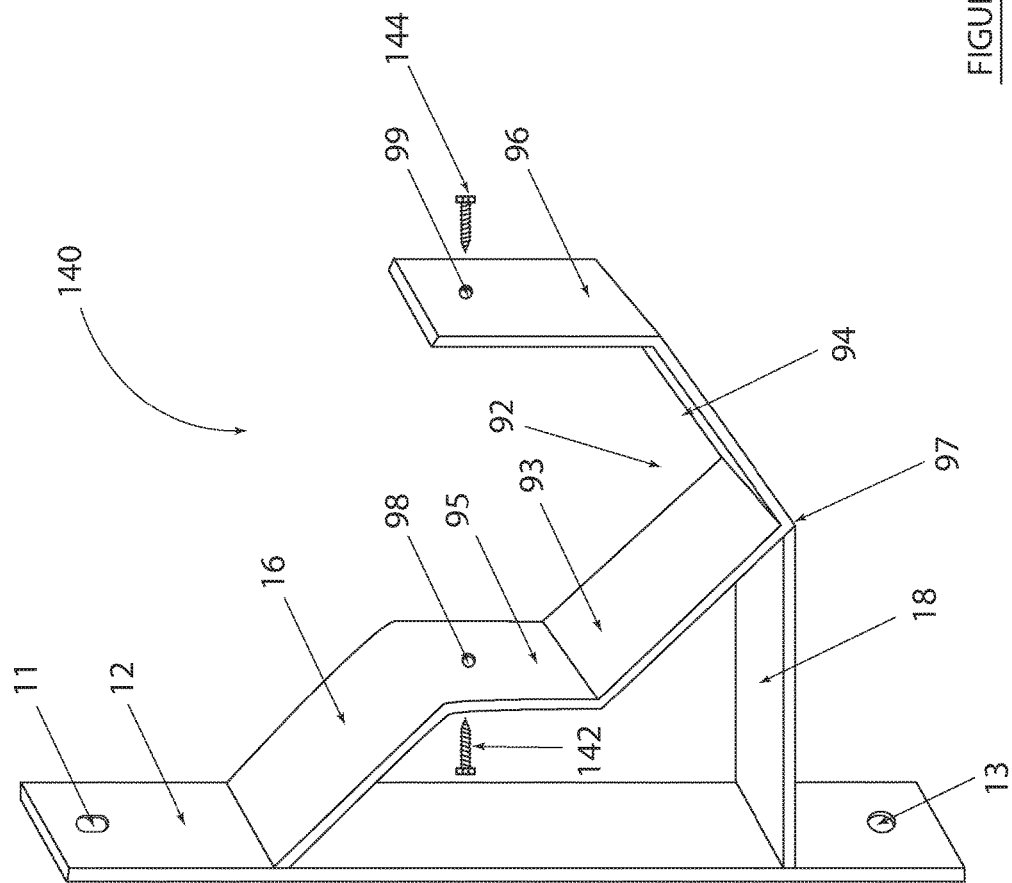

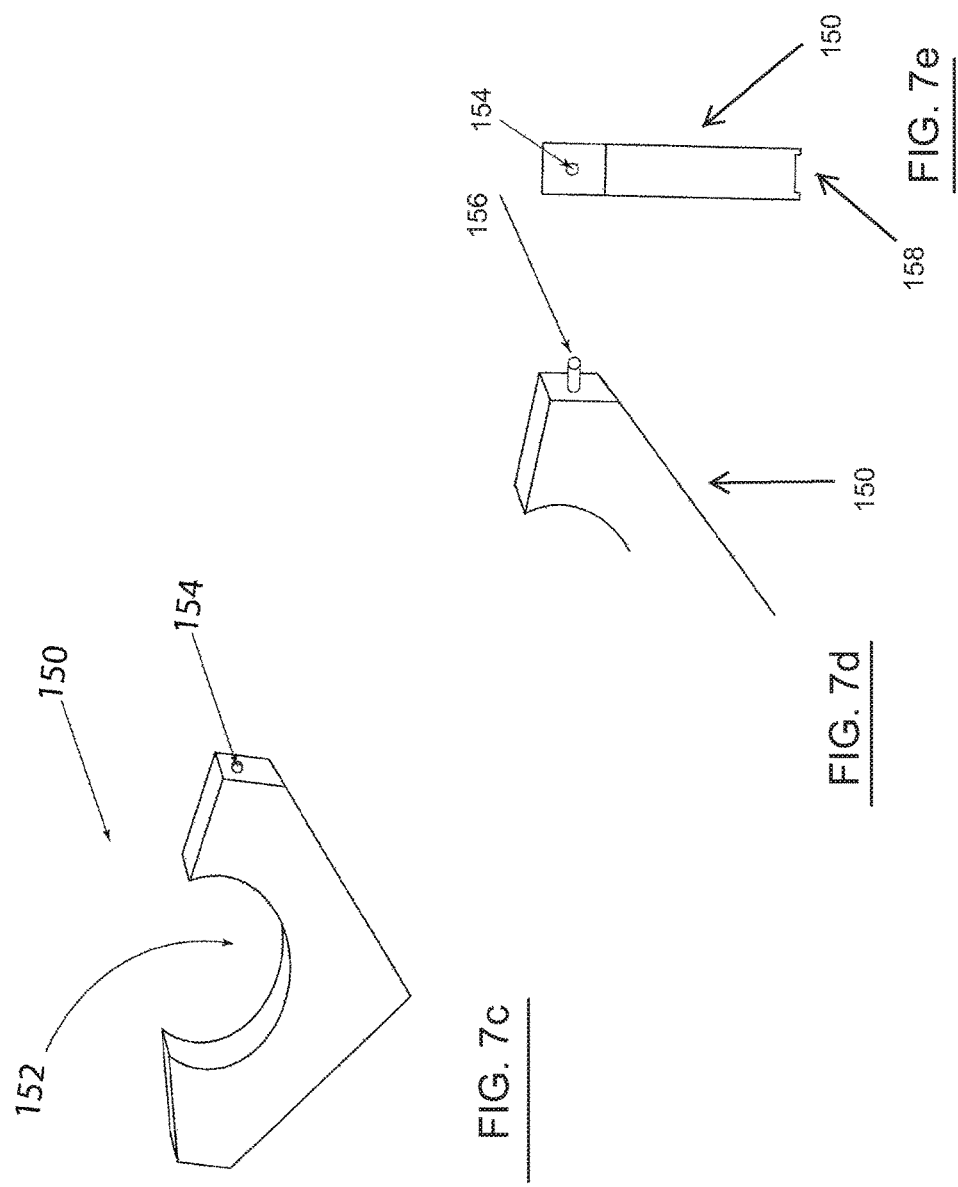

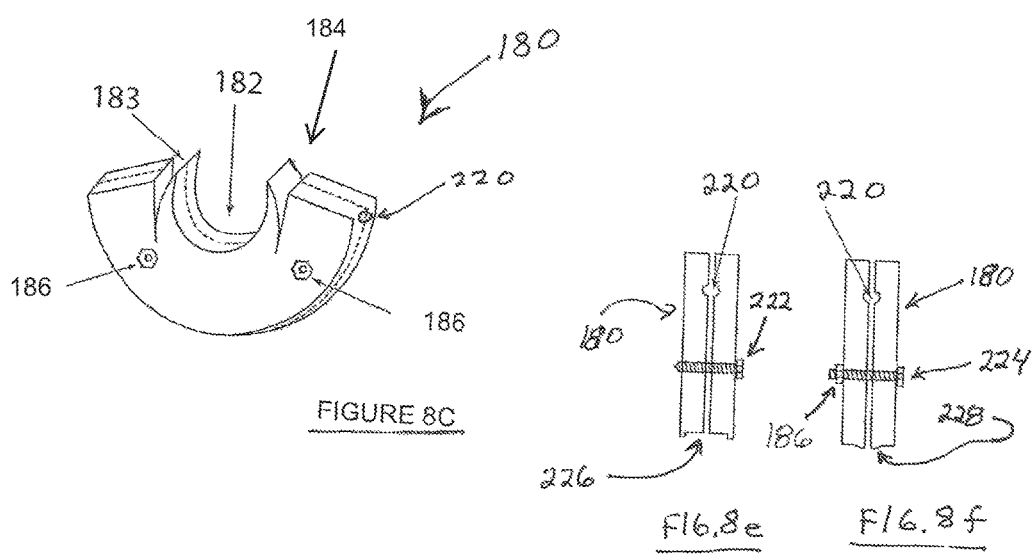
FIGURE 8c
FIG. 8e    FIG. 8f
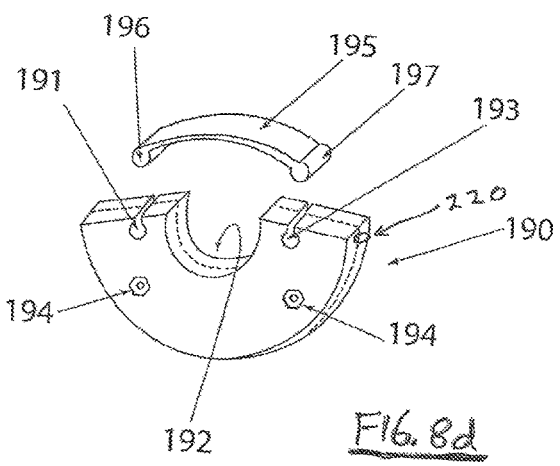
FIG. 8d

BRACKET FOR MOUNTING A PIPE AWAY FROM A VERTICAL WALL

REFERENCE TO RELATED APPLICATIONS

This patent application is a Continuation-in-Part of patent application having Ser. No. 13/967,330, filed on Aug. 14, 2013, which is a Continuation-in-Part of patent application having Ser. No. 13/180,747, filed on Jul. 12, 2011, entitled "Apparatus for Securing and Stabilizing an Elevated Pipe," which published on Jan. 17, 2013, with publication number US2013/0015301A1. All previously filed applications referenced above in this paragraph are hereby incorporated by reference.

BACKGROUND OF THE INVENTION

Field of the Invention

The present invention relates generally to an apparatus for securing pipes to a wall, and more particularly, to a bracket for securing a pipe a short distance away from a vertical wall.

Description of Related Art

Modern buildings and homes have complex piping systems or networks involving extensive use of pipes. Pipes in homes and buildings can be very heavy due to their constructed material, such as metal gas pipes, and also are heavy due to the material they transport, such as water in sewer pipes. Securing such heavy pipes to a vertical wall using cost efficient materials and using minimal wall mounting surface area can be a challenge. Over an extended period of time and changing temperatures, mounting brackets can become weakened and damaged. The construction industry currently uses mounting structures that frequently fail to prevent costly repairs due to the expansion and contraction of pipes resulting from changing temperatures.

Furthermore, water pipes continuously exert stress on mounting structures due to the variations in the weight of the pipes from varying levels of water flow and significant vibrations caused by water flow starting and stopping within the pipes. Currently the construction industry typically uses nails, screws and simple J-shaped mounting brackets to secure pipes to a building structure, such as a vertical wall, which can result in a loss of the desired gradient of the piping system, or a complete failure of the mounting structures that secure pipes to a wall. Additionally, by mounting pipes directly against a vertical wall, the piping path and gradient can be disrupted due to the larger diameter of the pipes at the pipe connections and joints.

Accordingly, there exists a need for a cost effective and space efficient mounting apparatus or bracket that can be relied upon to securely mount pipes to a vertical wall for many years and be able withstand the changing ambient temperatures and vibrational stresses associated with piping networks in building structures.

ASPECTS AND SUMMARY OF THE PRESENT INVENTION

In order to overcome these shortcomings and others in the prior art, one aspect of the present invention is to provide a stronger and more stable mounting bracket that securely fastens a pipe to a vertical wall for an extended period of time despite changing temperatures and vibrational forces.

Another aspect of the present invention is to provide a mounting bracket that positions a pipe away from a vertical wall to minimize temperature differences from being passed between the pipe and the vertical wall to which the pipe is mounted.

A further aspect of the present invention provides a mounting bracket that maintains the proper path and gradient of a piping system for an extended period of time by mounting the pipes a short distance away from a vertical wall to allow for the larger diameter sections at the connections and joints between individual pipe sections.

An additional aspect of the present invention is to provide a mounting bracket for a pipe that utilizes minimal wall surface area to mount a pipe to a vertical wall.

In order to achieve these aspects and others, the present invention provides a bracket for securely mounting a pipe away from a vertical wall. The pipe mounting bracket includes a linear support to be secured to a vertical wall and a pipe receptacle for receiving and supporting the pipe. The pipe receptacle includes a segment of a circle configuration. An extension is connected between the linear support and the pipe receptacle, wherein the extension extends upward, non-horizontally, non-vertically, and away from the pipe receptacle toward the linear support so as to position a pipe within the pipe receptacle a distance away from the linear support and a vertical wall to which the linear support is to be secured. A brace is connected between the linear support and a lower portion of the pipe receptacle to provide additional support to position the pipe receptacle a distance away from a vertical wall to which the linear support is to be secured. The linear support extends below and beyond the lower portion of the pipe receptacle to provide additional stability for securing a pipe contained with the pipe receptacle a distance away from a vertical wall to which the linear support is to be secured.

The bracket can be produced from powder-coated steal that further extends the durability and stability of the bracket by preventing corrosion and limiting the failure of the bracket. The bracket can include a locking mechanism wherein a cylindrical item, such as a pipe, is secured within the pipe receptacle and then locked into place to increase overall stability. The locking mechanism can be a simple modification of the pipe receptacle wherein its end is curved requiring the cylindrical item to be snapped into the pipe receptacle.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention and that such other structures do not depart from the spirit and scope of the invention in its broadest form.

BRIEF DESCRIPTION OF THE DRAWINGS

FIG. 3b is a another perspective view of the bracket shown in FIG. 3a;

FIG. 4 is a perspective view of a bracket for mounting a pipe configured in accordance with a third embodiment of the present invention;

FIG. 4a is a cross-sectional view of the bracket shown in and taken along line 4a-4a of FIG. 4 which illustrates a crease in a pipe receptacle;

FIG. 4b is a cross-sectional view of the bracket including a curve in a cross-sectional view of the pipe receptacle;

FIG. 5a is a perspective view of the a spacer configured in accordance with the present invention;

FIG. 5b is a side view of the spacer shown in FIG. 5a;

FIG. 5c is a side view of the spacer shown in FIG. 5b with securing pins removed;

FIG. 5d is an end view of the spacer shown in FIG. 5b;

FIG. 5e is an end view of the spacer shown in FIG. 5b;

FIG. 7a is a perspective view of a bracket configured in accordance with a ninth embodiment of the present invention;

FIG. 7b is a perspective view of a bracket configured in accordance with a tenth embodiment of the present invention;

FIG. 7c is a perspective view on a spacer configured in accordance with another embodiment of the present invention;

FIG. 7d is an enlarged view of a portion of the spacer shown in FIG. 7c with a securing pin;

FIG. 7e is an end view of the spacer shown in FIGS. 7c and 7d;

FIG. 8c is a perspective view of a spacer configured in accordance with a further embodiment of the present invention;

FIG. 8d is a perspective view of a spacer configured in accordance with another embodiment of the present invention;

FIG. 8e is an end view of the spacer shown in FIG. 8c; and

FIG. 8f is an end view of the spacer shown in FIG. 8c.

DETAILED DESCRIPTION OF PREFERRED EMBODIMENTS

Figure 1:
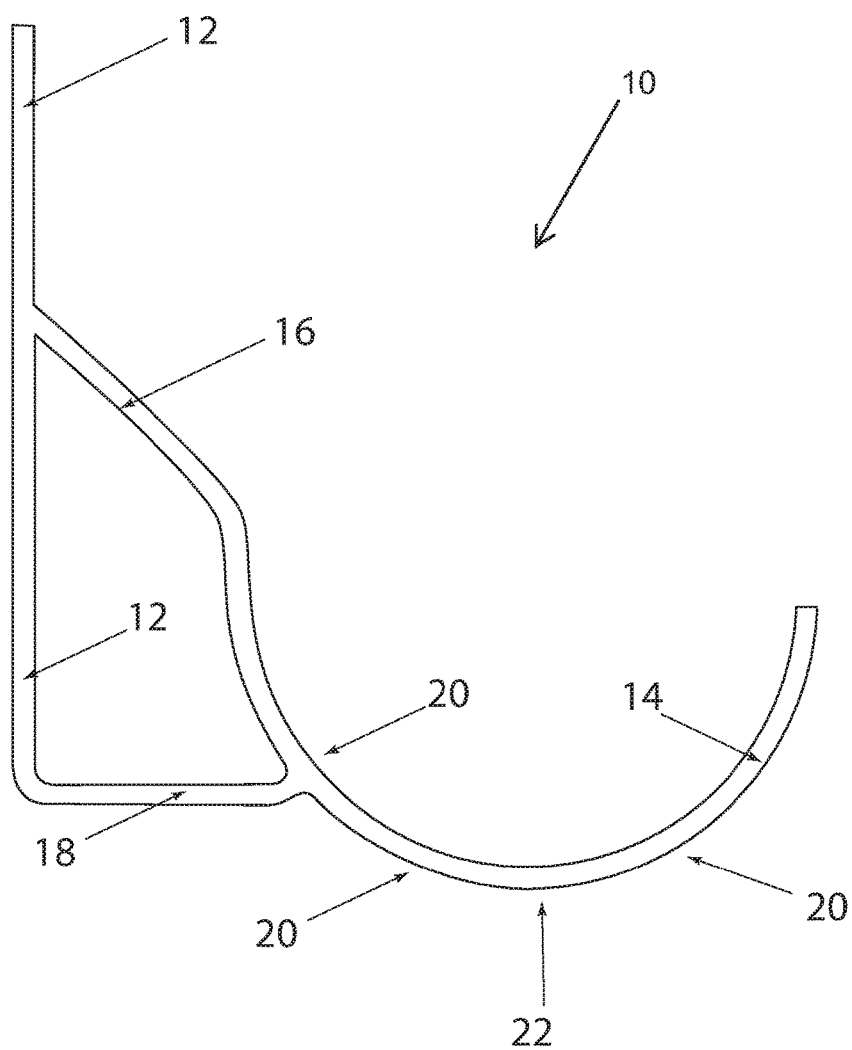
FIG. 1 is a side view of a bracket for mounting a pipe configured in accordance with a first embodiment of the present invention.

FIG. 1 illustrates a side view of a bracket 10 for mounting a pipe configured in accordance with a first embodiment of the present invention. The bracket 10 is designed for securing a cylindrical item to a vertical surface, such as a wall. The bracket 10 includes a linear support 12 and a pipe receptacle 14. The pipe receptacle 14 preferably is configured for receiving a circular pipe, and thus has a circular or a segment of a circular configuration for receiving a circular pipe. In other embodiments, the pipe receptacle 14 could have a rectangular or V-shaped configuration for receiving a pipe or a non-circular item, such as a rectangular shelf.

An extension 16 is connected between the linear support 12 and the pipe receptacle 14. The extension 16 extends upward, non-horizontally, non-vertically, and away from the pipe receptacle 14 towards the linear support 12 in order to position a pipe within the pipe receptacle 14 a distance away from the linear support 12 and a vertical wall to which the linear support 12 is to be secured.

A brace 18 is connected between the linear support 12 and a lower portion 20 of the pipe receptacle 14. The brace 18 preferably is at a right angle to the linear support 12, but can be at different angles relative to the linear support 12. The bracket 10 preferably is formed as a unitary piece, but can be separate elements that are secured together, such as by welding. The bracket 10 preferably is fabricated from a metal composition which additionally can be a powder coated metal. The bracket 10 also can be fabricated from other materials, such as plastic.

Figure 2:
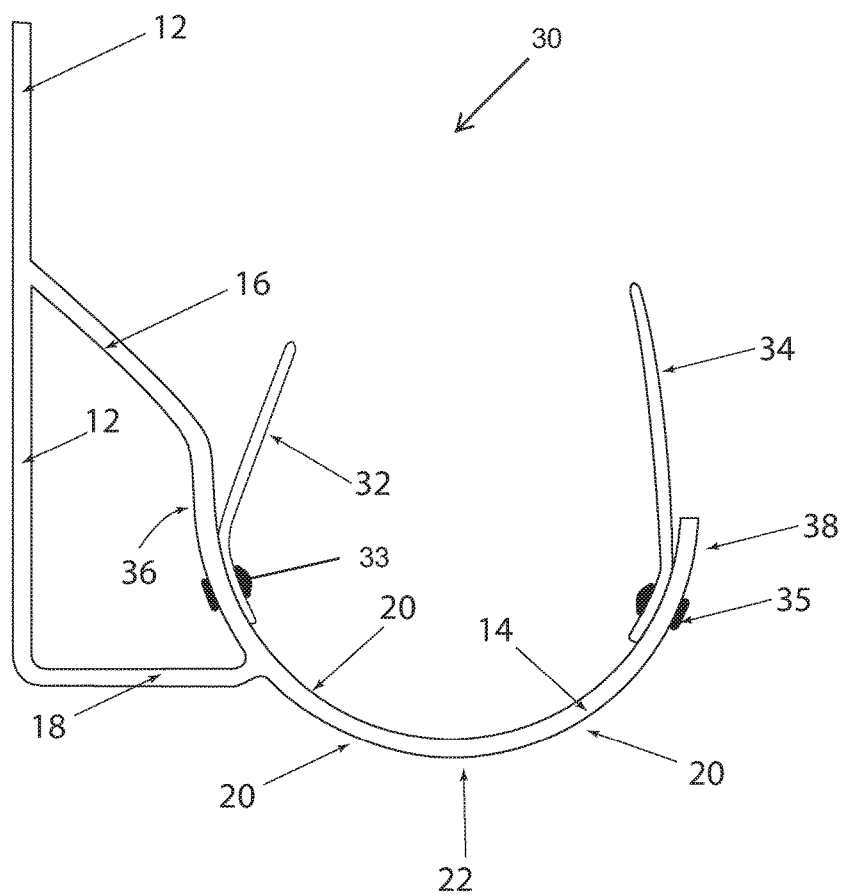
FIG. 2 is a side view of the bracket shown in FIG. 1, wherein securing tabs are attached to a pipe receptacle.

FIG. 2 illustrates a bracket 30 configured is accordance with a second embodiment of the present invention. The bracket 30 is similar to the bracket 10 shown in FIG. 1, except the bracket 30 includes securing tabs 32, 34 on the upper portions 36, 38 of the pipe receptacle 14. The securing tabs 32, 34 preferably are secured to the upper portions 36, 38 by welding, glue, screws, or rivets 33, 35 located within holes of the pipe receptacle 14. The securing tabs 32, 34 are preferably metal prongs that function to secure a pipe within the pipe receptacle 14 by being bent down and around a pipe after the pipe is located within the pipe receptacle 14.

Figure 3A:
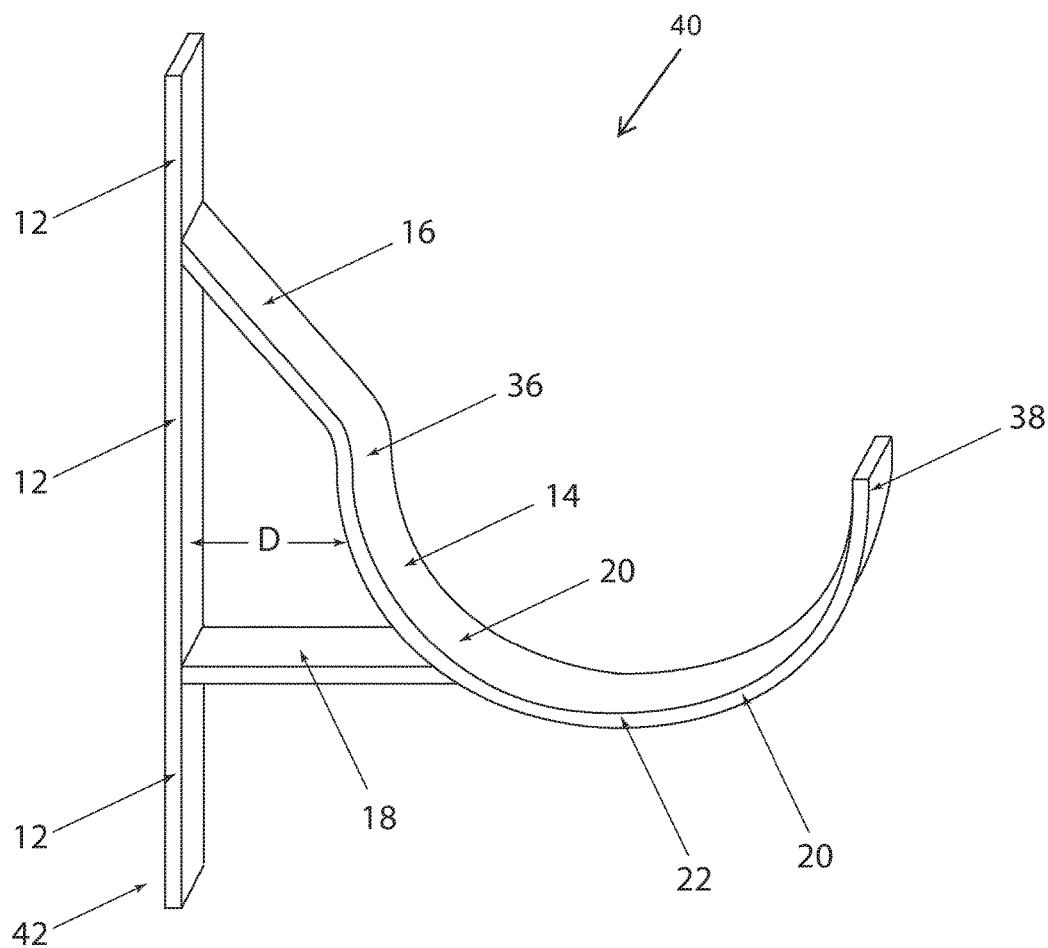
FIG. 3a is perspective view of a bracket for mounting a pipe configured in accordance with a second embodiment of the present invention.
Figure 3B:
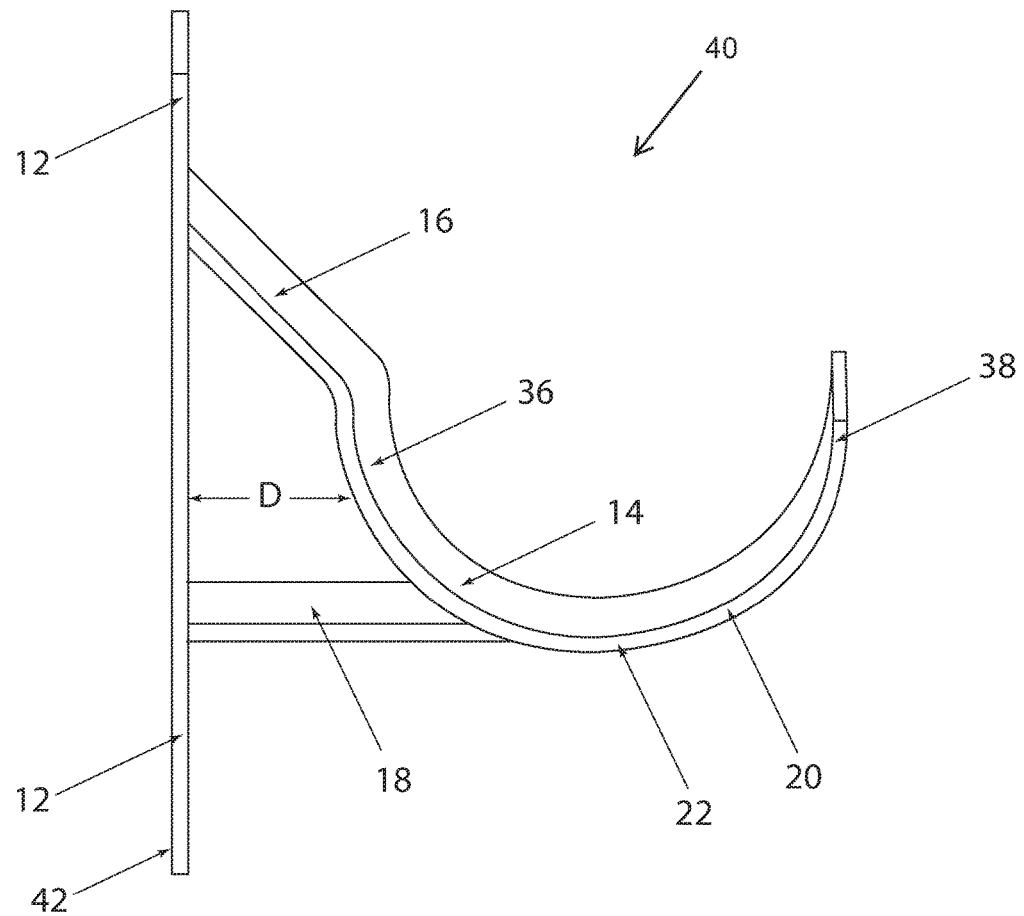

FIGS. 3a and 3b illustrate a bracket 40 for mounting a pipe to a vertical wall. The bracket 40 is similar to the bracket 10 shown in FIG. 1, except the linear support 12 extends beyond and below the lower portion 20 of the pipe receptacle 14. In fact, in the illustrated embodiment the FIGS. 3a and 3b, the lower portion 42 of the linear support 12 extends below the bottom or lowest point 22 of the pipe receptacle 14. The extension 16 and the brace 18, which each are connected between the linear support 12 and the pipe receptacle 14, function to position a pipe located within the pipe receptacle 14 a distance "D" from linear support 12, and a vertical wall to which the linear support 12 is to be secured. The brace 18 is connected to the linear support 12 and the bottom 22 or lowest point 22 of the pipe receptacle 14. The brace 18 can be at a ninety degree angle with the linear support 12, but does not have to be at a right angle with the linear support 12.

FIG. 4 illustrates a bracket 50 configured in accordance with a further embodiment of the present invention. Bracket 50 is similar to the bracket 40 shown in FIGS. 3a and 3b, except the brace 52 is not at a right angle with respect to the linear support 12. Brace 52 is illustrated to demonstrate that braces of the current invention do not necessarily need to be at right angles with respect to the linear support 12, nor do the braces need to be connected to the bottom 22 or the lower portion 20 of the pipe receptacle 14. For example, brace 52 is not mounted perpendicular to the linear support 12, and brace 54 is connected to the upper portion 36 of the pipe receptacle 14. Similarly, brace 52 is mounted to a lower portion 42 of the linear support 12, and brace 52 is not mounted perpendicularly to the linear support 12.

FIG. 4 illustrates that the braces 18, 52, 54 of the present invention can be mounted at different angles on the linear support 12, and further, the braces 18, 52, 54 can be mounted to different locations to the pipe receptacle 14. It also should be noted that while three braces 18, 52, 54 are illustrated in FIG. 4, only one brace 18, 52 or 54 is needed in order for the embodiment to be configured in accordance with an embodiment of the present invention. Of course, while not generally necessary, more than one brace could be utilized in an embodiment of the present invention. Additionally, apertures can be formed into the linear support 12 at multiple locations for mounting or securing the linear support 12 to a vertical wall. FIG. 4 illustrates an aperture 11 in an upper portion 44 of the linear support, and an aperture 13 is illustrated in a lower portion 42 of the linear support 12.

FIG. 4 also illustrates that a crease or groove 56 can be formed into the pipe receptacle 14 to provide additional strength to the pipe receptacle 14. The crease 56 preferably extends from the upper portion 36 of the pipe receptacle 14 to the opposing upper portion 38 of the pipe receptacle 14. FIG. 4a illustrates a cross-sectional view of the crease 56 shown in and taken along line 4a-4a of FIG. 4. In other embodiments a cross-section of the pipe receptacle 14 can form a semicircle or a U-shape for added strength instead of a crease or a groove 56 formed in the pipe receptacle 14, as shown in FIG. 4b.

Figure 4C:
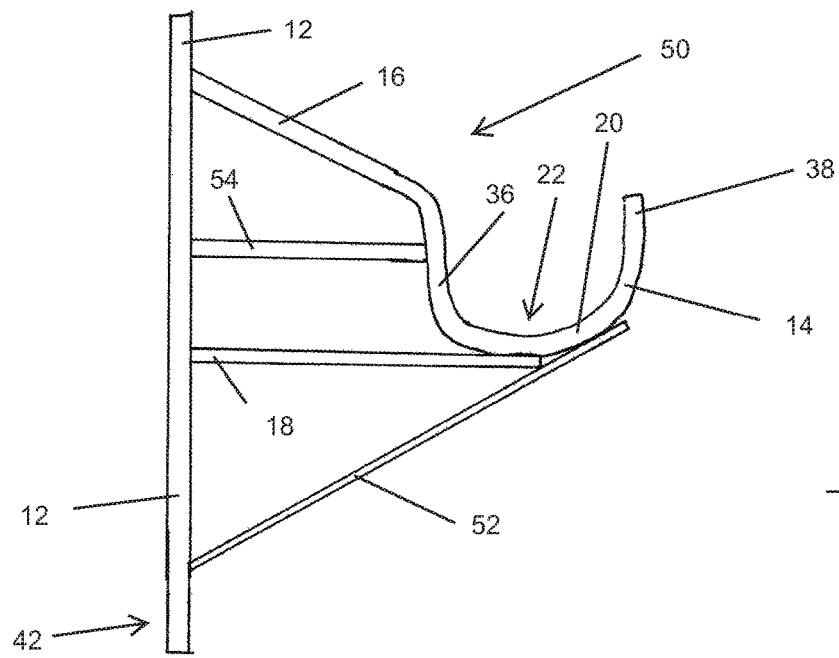
FIG. 4c is a side view of the bracket shown in FIG. 4.

FIG. 4c is a side view of the bracket 50 shown in FIG. 4. Brace 18 is shown connected to the bottom 22 of the pipe receptacle 14 and the linear support 12. The brace 52 is connected to the linear support 12 and the bottom 22 of the pipe receptacle 14. The bottom 22 is the lowest point of the lower portion 20 of the pipe receptacle 14. The brace 54 is connected to the linear support 12 and the upper portion 36 of the pipe receptacle 14.

Figure 4D:
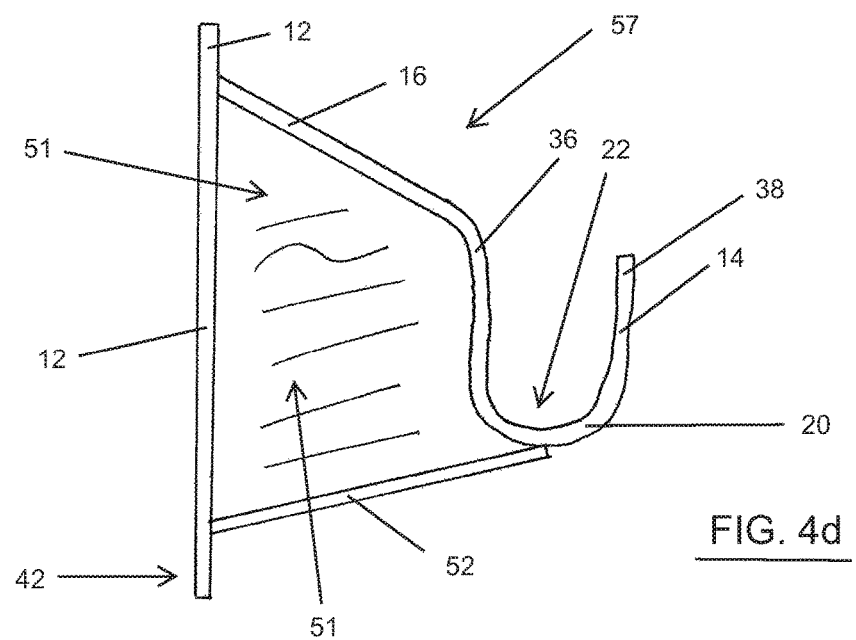
FIG. 4d is a side view of the bracket shown in FIG. 4c, wherein a side panel is attached to the bracket to support the pipe receptacle.

FIG. 4d is a side view of a bracket 57, which is similar to the bracket 50, except bracket 57 includes a side panel 51 connected to the linear support 12, the extension 16, the brace 52, and the pipe receptacle 14. The side panel 51 can be included in the bracket 57 for additional support. The side panel 51 can be a unitary piece of the bracket 57, or attached, such as by welding, to the linear support 12, the brace 52, and the pipe receptacle 14. The side panel 51 can provide the necessary support for the pipe receptacle 14, thus eliminating the braces 52, 54, and/or 18. The side panel 51, linear support 12, pipe receptacle 14, extension 16, and braces 54, 18, and 52 are preferably constructed of metal, such as steel. It should also be noted that the extension 16, and braces 54, 18, and 52 can be longer or shorter in length, thus positioning the pipe receptacle 14 closer or further away from the linear support 12. Similarly, the pipe receptacle 14 can have a larger or smaller diameter to accommodate different sized pipes. The side panel 51 preferably is a planar or flat sheet of metal welded to the linear support 12, pipe receptacle 14, extension 16, and braces 54, 18, or 52.

Figure 5:
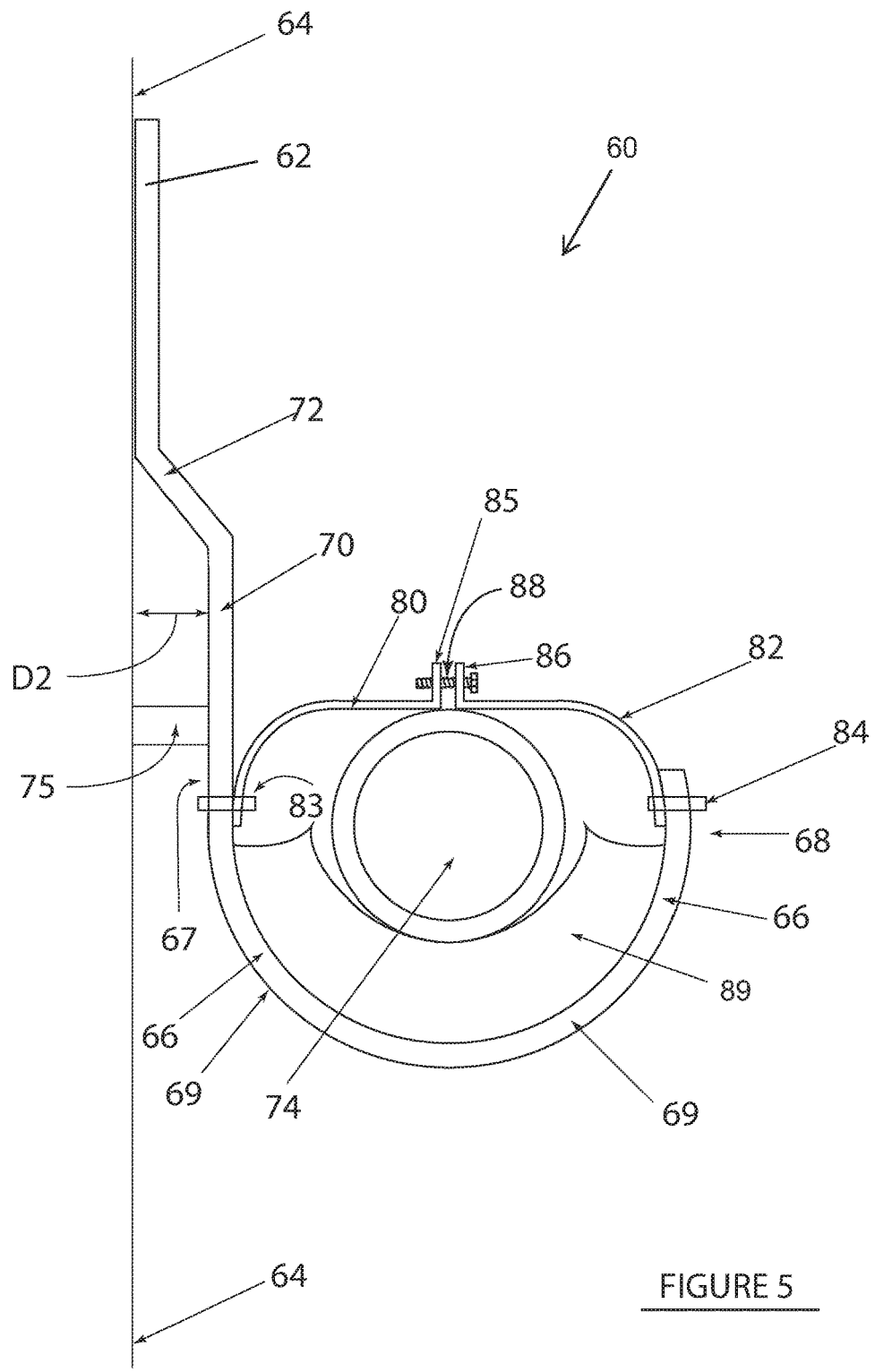
FIG. 5 is a side view of a bracket for mounting a pipe configured in accordance with a fourth embodiment of the present invention.

FIG. 5 illustrates a bracket 60 configured in accordance with another embodiment of the present invention. The bracket 60 includes a linear support 62 to be secured to a vertical wall 64. The bracket 60 includes a pipe receptacle 66 having an upper portion 67 and an opposing upper portion 68. The pipe receptacle 66 includes a lower portion 69, and a lower portion 69 having a bottom. An upper leg 70 is attached to the upper portion 67 of the pipe receptacle 66. An extension 72 is connected between the linear support 62 and the upper leg 70 in order to position a pipe 74 within the pipe receptacle 66 a distance D2 from the wall 64. In a preferred embodiment, the linear support 62, the extension 72, the upper leg 70, and the pipe receptacle 66 are a unitary component constructed of metal.

In accordance with another embodiment of the present invention, a post 75 is located between the upper portion 67 or the upper leg 70 of the pipe receptacle 66 and the vertical wall 64 in order to position the pipe receptacle 66 a distance D2 from the wall 64. The post 75 preferably is constructed of a hard rubber, but can be constructed of numerous materials, including wood, metal, or plastic. The post 75 preferably is affixed to the outer surface of the upper leg 70, but also can be affixed lower to the other surface of the upper portion 67 of the pipe receptacle 66. The post 75 preferably is not secured to the wall 64, but rests against the wall 64 while supporting a pipe 74.

In accordance with a further aspect of the present invention, a pair of locking arms 80, 82 are attached to the upper portions 67, 68, respectively, of the pipe receptacle 66. The locking arms 80, 82 can be constructed of numerous materials, including metal and plastic. The locking arms 80, 82 can be affixed to the upper portions 67, 68 of the pipe receptacle 66 by welding, gluing, or bolts 83, 84. The opposing ends of the locking arms 80, 82 include lips or ridges 85, 86 which are configured to be tightened together by a bolt or screw 88 within apertures of the ridges 85, 86. Thus, when a pipe 74 is positioned within the pipe receptacle 66, the locking arms 80, 82 extend across and over the top of the pipe 74 and are secured together by a screw 88 to secure the pipe 74 within the pipe receptacle 66.

In accordance with another aspect of the present invention, a spacer 89 is located on the inner surface of the lower portion 69 of the pipe receptacle 66. The spacer 89 functions to decrease the diameter of the inner circumference of the pipe receptacle 66 to accommodate a pipe 74 having a significantly smaller diameter than the inner diameter of the pipe receptacle 66. The spacer 89 preferably is constructed of a hard rubber that is glued to the inner surface of the power portion 69 of the pipe receptacle 66.

FIG. 5a illustrates a spacer 200 to be located within the pipe receptacle 14 to accommodate a pipe having a substantially smaller diameter than the pipe receptacle 14. Pins 202 can be included in the opposing ends of the spacer 202 to secure the spacer 200 within the pipe receptacle 14. For example, the pins 202 could be inserted into holes in the pipe receptacle 14 for the rivets 33, 35 shown in FIG. 2 to secure the spacer 200 within the pipe receptacle 14. FIG. 5c illustrates a side view of the spacer 200 showing apertures 204 in shadow. The apertures 204 are for receiving the pins 202. The spacer 200 preferably is constructed of a flexible material, such as rubber.

FIG. 5d is an end view of the spacer 200 shown in FIG. 5c. The bottom of the spacer 200 includes a ridge or edge 206 for properly positioning or locating the spacer within a pipe receptacle 14 having a crease or groove 56, such as shown in FIG. 4.

FIG. 5e is an end view of the spacer 200 shown in 5c having a different bottom. Lips or edges 208 are included on opposing sides of the bottom of the spacer 200 to extend over opposing sides of the pipe receptacle and properly position the spacer 200 within the pipe receptacle 14.

Figure 6A:
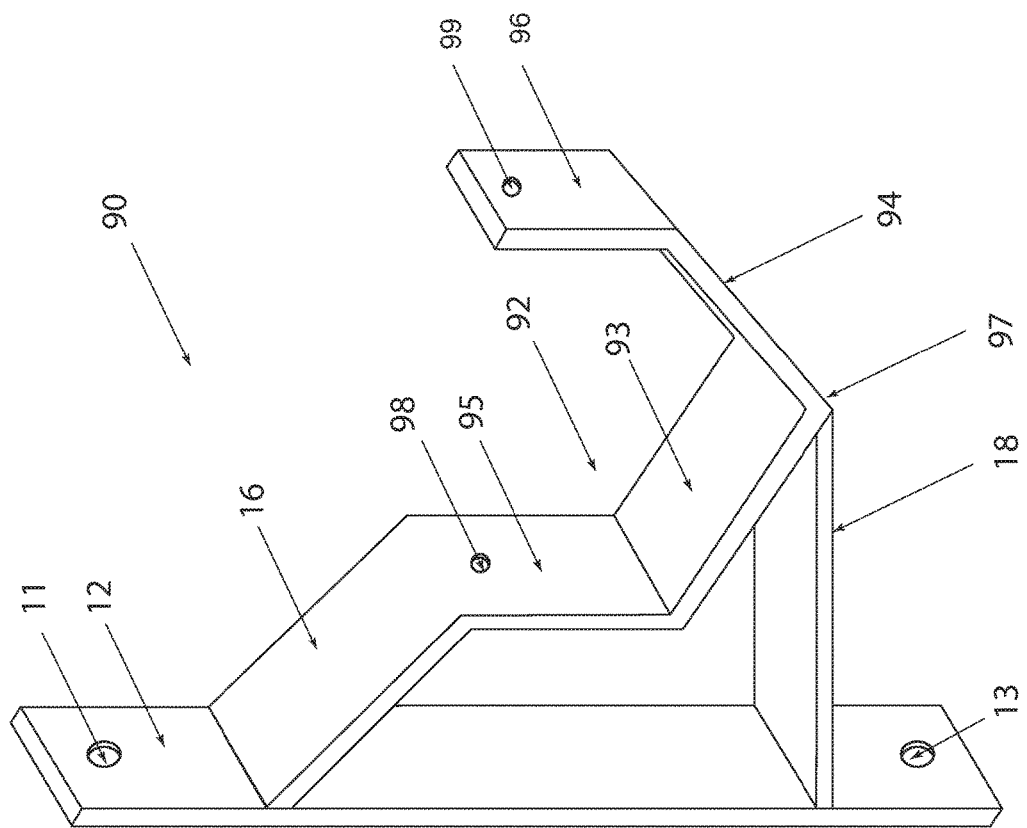
FIG. 6a is a perspective view of a bracket configured in accordance with a fifth embodiment of the present invention.

FIG. 6a is a perspective view of a bracket 90 configured in accordance with another embodiment of the present invention. The bracket 90 includes a linear support 12, an extension 16, a brace 18, and a pipe receptacle 92. The pipe receptacle 92 has four linear sides in the shape of a portion of a hexagon. The bottom sides 93, 94 and the opposing sides 95, 96 form the pipe receptacle 92. A bottom trough 97 is formed by the bottom sides 93, 94, which positions a pipe in the center of the pipe receptacle 92. Apertures 98, 99 are formed in the sides 95, 96 for bolts or screws to secure a pipe within the pipe receptacle 92, for mounting securing tabs as shown in FIG. 2.

An extension 16 connects an upper end of side 95 of the pipe receptacle 92 to the linear support 12, and a brace 18 connects the trough 97 of the pipe receptacle 92 to the linear support 12. Apertures 11, 13 are located within the linear support 12 for securing the linear support 12 to a vertical wall.

Figure 6B:
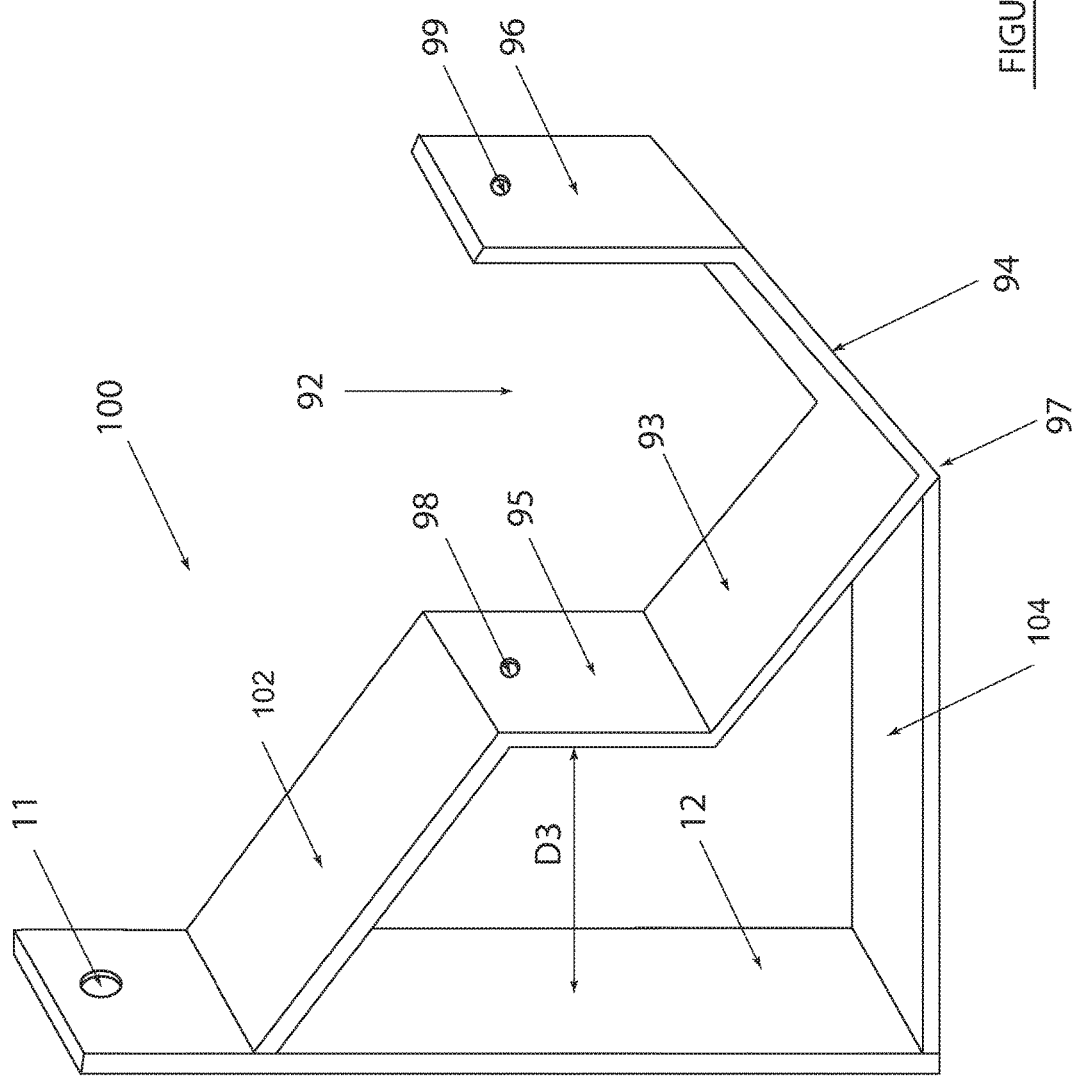
FIG. 6b is a perspective view of a bracket configured in accordance with a sixth embodiment of the present invention.

FIG. 6b is a perspective view of a bracket 100 configured in accordance with another embodiment of the present invention. The bracket 100 is similar to bracket 90, wherein bracket 100 includes a linear support 12, an extension 16, a brace 18, and a pipe receptacle 92 having four sides 93, 94, 96, 96 of a hexagon. However, the extension 102 and the brace 104 of bracket 100 are longer than the extension 16 and brace 18 of bracket 90 (FIG. 6a) in order to position a pipe within the pipe receptacle 92 a further distance D3 from a vertical wall to which the linear support 12 is to be mounted.

Figure 6C:
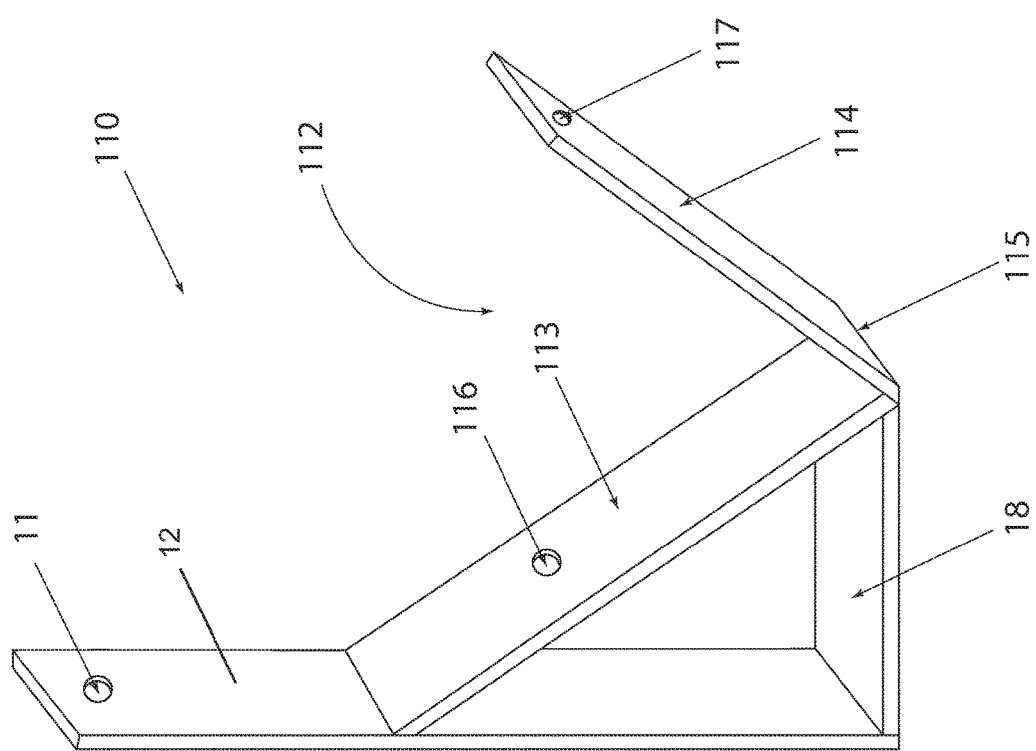
FIG. 6c is a perspective view of a bracket configured in accordance with a seventh embodiment of the present invention.

FIG. 6c is a perspective view of a bracket 110 configured in accordance with another embodiment of the present invention. The bracket 110 forms a pipe receptacle 112 shaped like a V by two sides 113, 114. A trough 115 is formed at the bottom of the pipe receptacle 112. The first side 113 of the pipe receptacle 112 is connected to the linear support 12 and the brace 18. The other side 114 of the pipe receptacle 112 is connected to the bracket 110 at the trough 115. An aperture 116 is located in the side 113 and an aperture 117 is located in the side 114 for securing a spacer 150 (as shown in FIG. 7c) within the pipe receptacle 112. The pipe receptacle 112 preferably is formed from a unitary piece of metal.

Figure 6D:
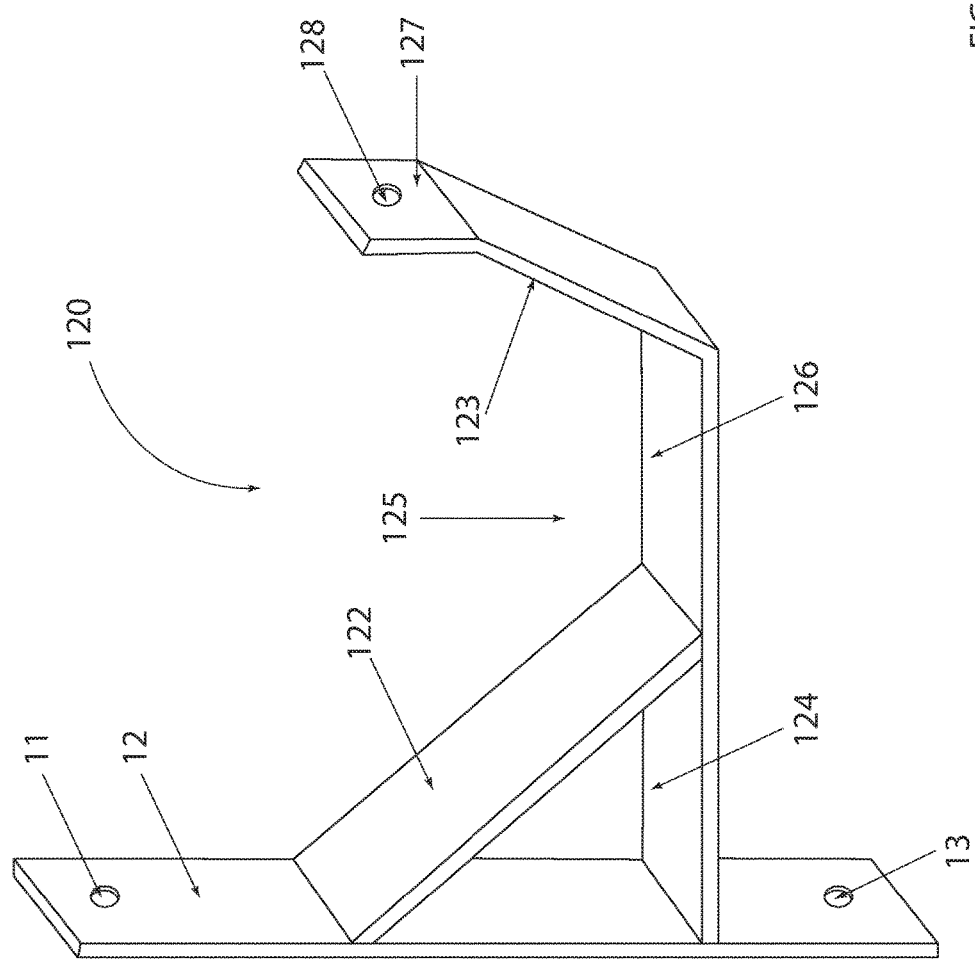
FIG. 6d is a perspective view of a bracket configured in accordance with an eighth embodiment of the present invention.

FIG. 6d is a perspective view of a bracket 120 configured in accordance with a further embodiment of the present invention. The bracket 120 includes a pipe receptacle 125 formed by an extension 122 and a brace 124 which are both connected to the linear support 12. The brace 124 extends from the linear support 12 to form the bottom 126 of the pipe receptacle 125, and also the sidewalls 123 and 127. The brace 124, bottom 126, and sidewalls 123 and 127 preferably are formed from a unitary piece of metal. The extension 122 is connected to the linear support 12 and the brace 124 to strengthen and stabilize the pipe receptacle 125. Apertures 11, 13 are included in the linear support 12 for securing the linear support 12 to a vertical wall. An aperture 128 is included in the sidewall 127 for securing a pipe within the pipe receptacle 125.

FIG. 7a is a perspective view of a bracket 130 configured in accordance with a further embodiment of the present invention. The bracket 130 is similar to the bracket 110 shown in FIG. 6c, except a lower portion 42 of the linear support 12 extends below the brace 18 and the trough 115. The extension of the lower portion 42 of the linear support 12 below the brace 18 and trough 115 functions to further strengthen and stabilize the pipe receptacle 112 when the bracket 130 is mounted to a vertical wall.

FIG. 7b is a perspective view of a bracket 140 configured in accordance with a further embodiment of the present invention. The bracket 140 is similar to the bracket 90 in FIG. 6a, except screws 142, 144 are illustrated for securing a pipe within the pipe receptacle 92. The screws 142, 144 can be used to secure a pipe directly, by mounting securing tabs 32, 34, or by securing a spacer within the pipe receptacle 140, such as shown in FIG. 7c.

FIG. 7c is a perspective view of a spacer 150 configured in accordance with a further embodiment of the present invention. The spacer 150 includes an opening 152 for receiving a pipe. The spacer 150 is configured to fit firmly within the pipe receptacle 92 of bracket 140 shown in FIG. 7b. The screws 142, 144, fit though apertures 98, 99, respectively, of the bracket 140 to screw into apertures (only aperture 154 shown) on opposing sides of the spacer 150 to secure the spacer 150 within the pipe receptacle 92 of the bracket 140. The spacer 150 preferably is formed from rubber or a polymer as unitary component.

FIG. 7d illustrates a pin 156 being included within the aperture 154 for securing the spacer 150 within a pipe receptacle. FIG. 7e is an end view of the spacer 150 having a bottom with lips or edges 158 for extending over the sides of a pipe receptacle and properly positioning the spacer 150 within the pipe receptacle.

Figure 8A:
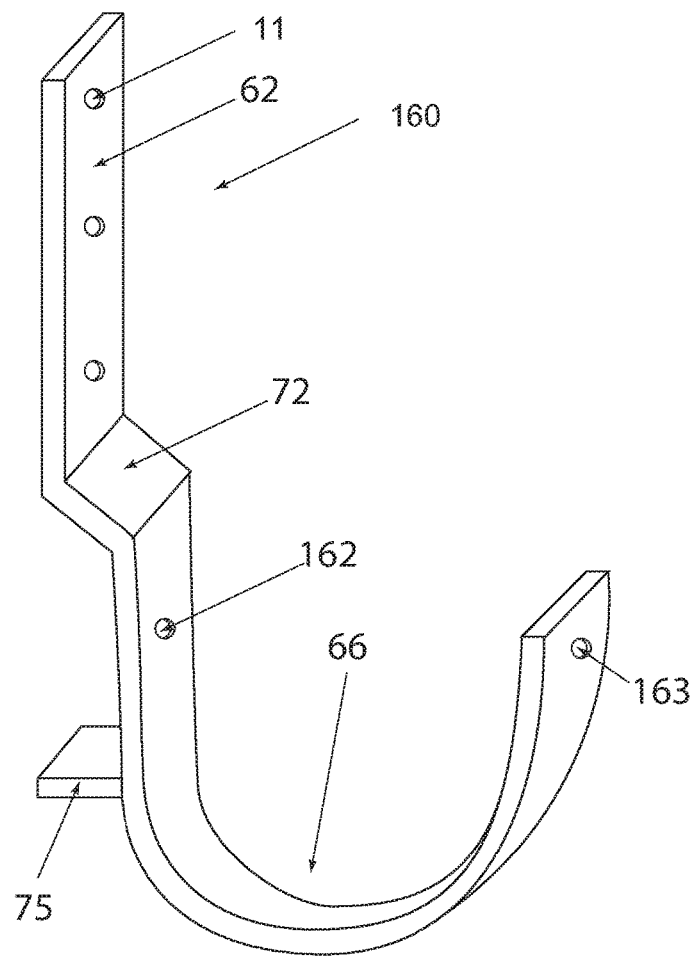
FIG. 8a is a perspective view of the bracket shown in FIG. 5 without the spacer and the securing tabs.

FIG. 8a is a perspective view of bracket 160, which is similar to the bracket 60 shown in FIG. 5 without the pipe 74, spacer 90, and locking arms 80, 82. The bolts 83, 84 and 88 also are not illustrated in FIG. 8a. FIG. 8a is provided to provide a clearer view of the linear support 62, extension 72, post 75, and pipe receptacle 66. Apertures 162, 163 are shown in the pipe receptacle 66 for receiving bolts or screws 83, 84 to mount the locking arms 80, 82.

Figure 8B:
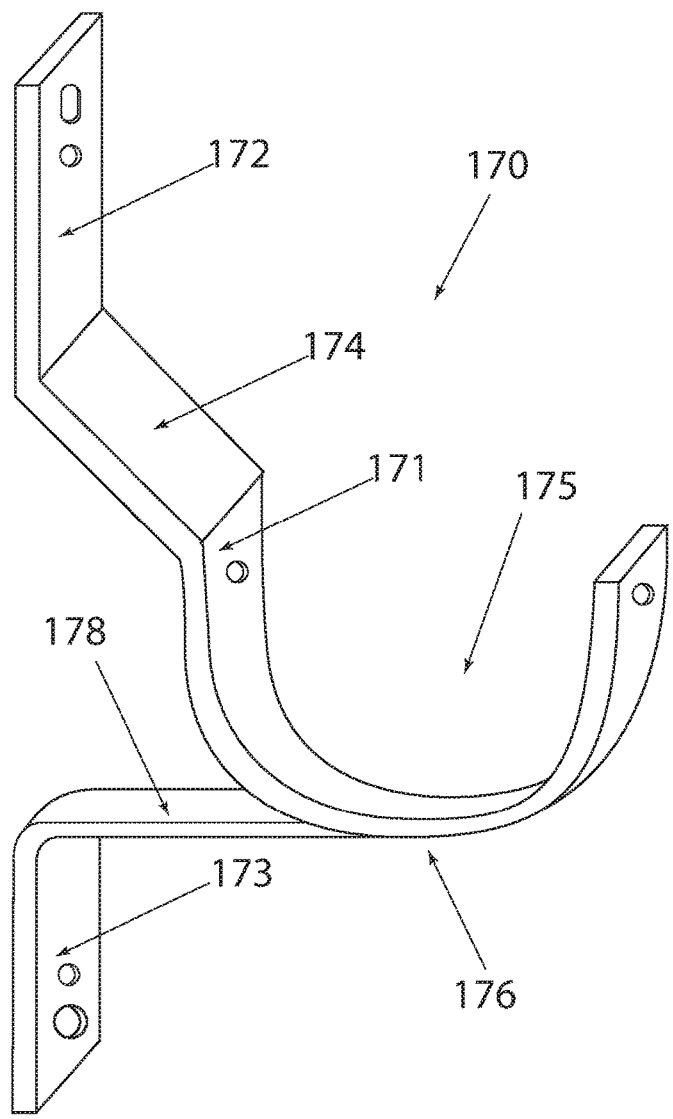
FIG. 8b is a perspective view of the bracket similar to the embodiment shown in FIGS. 3a and 3b, except the linear support is not continuous between the upper and the lower portions of the linear support.

FIG. 8b is a perspective view of a bracket 170 configured in accordance with a further embodiment of the present invention. Bracket 170 is similar to the bracket 40 shown in FIGS. 3a and 3b, except the linear support 12 does not extend between the extension 16 and the brace 18 as shown in FIGS. 3a and 3b. The linear support of bracket 170 includes an upper section 172 and a lower section 173. An extension 174 is connected between the upper section 172 and a top 171 of the pipe receptacle 175. The pipe receptacle 175 has a semicircle configuration. A brace 178 is connected between the lower section 173 of the linear support and the bottom 176 of the pipe receptacle 175.

FIG. 8c is a perspective view of a spacer 180 configured in accordance with another embodiment of the present invention. The spacer 180 preferably is constructed of rubber as a unitary component. The spacer 180 includes an opening or cutout 182 for receiving a pipe. Flexible wings 183, 184 are formed on opposing sides of the opening 182 for wrapping around a pipe and securing the pipe within the opening 182. Bolts 186 secure together the spacer 180 which is formed from multiple layers. Spacer 180 is sized to fit firmly within a pipe receptacle having a semicircle configuration. The spacer 180 is designed to enable a larger pipe receptacle to accommodate a pipe having a smaller diameter than the pipe receptacle. The spacer 180 also can function to assist in securing a pipe within a pipe receptacle.

FIG. 8d is a perspective view of a spacer 190 configured in accordance with another embodiment of the present invention. The spacer 190 is preferably constructed of rubber and includes an opening 192 for receiving a pipe. Bolts 194 secure together multiple layers of materials if the spacer 190 is not formed as a unitary component. A flexible band 195, preferably constructed of rubber, stretches across the opening 192 to secure a pipe within the opening 192. Rounded or cylindrical ends 196, 197 of the band 195 are secured within rounded slots 191, 193, respectively, to secure the band 195 to the spacer 190. Apertures 220 are included in the ends of the spacer 180 for receiving pins or screws to secure the spacer 180 within a pipe receptacle is desired.

FIG. 8e is an end view of the spacer 180 showing that the spacer 180 is comprised of two pieces that are held together by screw 222. Lips or edges 226 on the bottom of the spacer 180 keeps the spacer 180 secured within a pipe receptacle when the bolts screws 222 are tightened together to secure the edges 226 of the spacer 180 over and around a pipe receptacle.

FIG. 8f is an end view of the spacer 180 having bolts 224 and nuts 186 for securing together the two sections or pieces of the spacer 180. The bottom of the spacer 180 shown in FIG. 8f includes a ridge or edge 228 for properly positioning or locating the spacer 180 within a pipe receptacle 14 having a crease or groove, similar to the spacer 200 shown in FIG. 5d.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A bracket for mounting a pipe away from a vertical wall, said bracket comprising:
    a linear support to be secured to a vertical wall;
    a pipe receptacle for receiving and supporting the pipe, said pipe receptacle having a segment of a circle configuration including a bottom at the lowest point of the pipe receptacle;
    an extension connected between the linear support and the pipe receptacle, wherein the extension extends upward, non-horizontally, non-vertically, and away from the pipe receptacle toward the linear support so as to position the pipe within the pipe receptacle a distance away from the linear support and the vertical wall to which the linear support is to be secured; and
    a brace connected between the linear support and the lowest point of the pipe receptacle, said brace providing additional support to position the pipe receptacle a distance away from the vertical wall to which the linear support is to be secured, and wherein the linear support extends below and beyond the lowest point of the pipe receptacle to provide additional stability for securing the pipe contained with the pipe receptacle a distance away from a vertical wall to which the linear support is to be secured.

2. The bracket of claim 1, wherein the brace forms an approximate 90 degree angle with the linear support.

3. The bracket of claim 1, wherein the brace is linear.

4. The bracket of claim 1, wherein the extension is linear, thereby providing additional support to pipe receptacle.

5. The bracket of claim 1, wherein the linear support includes an aperture for securing the linear support to the vertical wall.

6. The bracket of claim 1, wherein a cross-section of the pipe receptacle is non-linear so as to provide additional strength to the pipe receptacle.

7. The bracket of claim 1, wherein the pipe receptacle includes a groove to provide additional strength to the pipe receptacle.

8. The bracket of claim 1, wherein a cross-section of the pipe receptacle parallel to the linear support includes a curved configuration to provide additional strength to the pipe receptacle.

9. The bracket of claim 1, wherein the pipe receptacle includes a crease to provide additional strength to the pipe receptacle.

10. A bracket for mounting a pipe away from a vertical wall, said bracket comprising:
    a linear support to be secured to the vertical wall;
    a pipe receptacle for receiving and supporting the pipe, said pipe receptacle having a segment of a circle configuration, and a cross-section of the pipe receptacle is non-linear so as to provide additional strength to the pipe receptacle;
    an extension connected between the linear support and the pipe receptacle, wherein the extension extends upward, non-horizontally, non-vertically, and away from the pipe receptacle toward the linear support so as to position a pipe within the pipe receptacle a distance away from the linear support and a vertical wall to which the linear support is to be secured; and
    a linear brace connected between the linear support and a lowest point of the pipe receptacle, said brace providing additional support to position the pipe receptacle a distance away from the vertical wall to which the linear support is to be secured, and wherein the linear support extends below and beyond the lowest point of the pipe receptacle to provide additional stability for securing the pipe contained with the pipe receptacle a distance away from the vertical wall to which the linear support is to be secured.

11. A bracket for mounting a pipe away from a vertical wall, said bracket comprising:
    a linear support to be secured to the vertical wall;
    a pipe receptacle for receiving and supporting the pipe, said pipe receptacle having a segment of a circle configuration including a bottom at the lowest point of the pipe receptacle;
    an extension connected between the linear support and the pipe receptacle, wherein the extension extends upward, non-horizontally, non-vertically, and away from the pipe receptacle toward the linear support so as to position the pipe within the pipe receptacle a distance away from the linear support and the vertical wall to which the linear support is to be secured;
    a first brace connected between the linear support and the bottom of the pipe receptacle, said first brace providing additional support to position the pipe receptacle a distance away from the vertical wall to which the linear support is to be secured, and wherein the linear support extends below and beyond the bottom of the pipe receptacle to provide additional stability for securing the pipe contained with the pipe receptacle a distance away from the vertical wall to which the linear support is to be secured;
    a second brace connected between the linear support and the bottom of the pipe receptacle, said second brace providing additional support to position the pipe receptacle a distance away from the vertical wall to which the linear support is to be secured; and
    a third brace connected between the linear support and an upper portion of the pipe receptacle, said third brace providing additional support to position the pipe receptacle a distance away from the vertical wall to which the linear support is to be secured.

* * * * *